Figure 1:
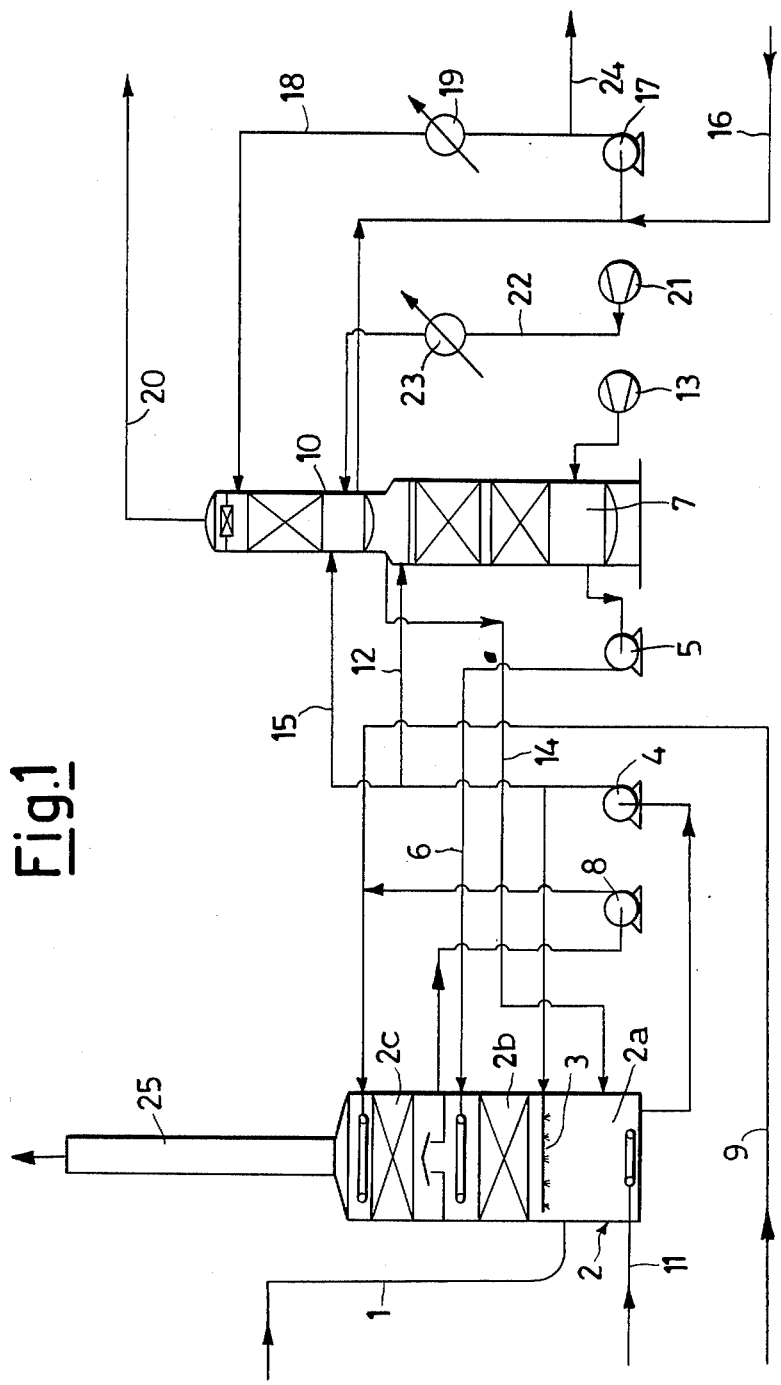

United States Patent [19]

Vitali et al.

[11] 4,164,548

[45] Aug. 14, 1979

[54] PROCESS FOR REMOVING $SO_2$ FROM GASES

[75] Inventors: Roberto Vitali; Sergio Villa, both of Milan; Costante Lotti, Bresso, all of Italy

[73] Assignee: "Il Gas Interale" S.p.A., Milan, Italy

[21] Appl. No.: 871,185

[22] Filed: Jan. 20, 1978

Related U.S. Application Data

[63] Continuation of Ser. No. 701,877, Jul. 1, 1976, abandoned, which is a continuation of Ser. No. 476,035, Jun. 3, 1974, abandoned.

[30] Foreign Application Priority Data

Jun. 1, 1973 [IT] Italy .............................. 24945 A/73
Feb. 20, 1974 [IT] Italy .............................. 48586 A/74

[51] Int. Cl.$^2$ ............................................ C01B 17/00
[52] U.S. Cl. .................................... 423/242; 55/73
[58] Field of Search ................. 423/242, 243, 244; 55/73

[56] References Cited

U.S. PATENT DOCUMENTS

| | | | |
|---|---|---|---|
| 1,589,133 | 6/1926 | Eustis | 423/242 X |
| 3,510,253 | 10/1970 | Fattinger et al. | 423/242 X |
| 3,847,570 | 11/1974 | Gunther | 423/242 X |

FOREIGN PATENT DOCUMENTS 134555 11/1919 United Kingdom ..................... 423/242

*Primary Examiner*—O. R. Vertiz
*Assistant Examiner*—G. A. Heller
*Attorney, Agent, or Firm*—Haseltine, Lake & Waters

[57] ABSTRACT

The invention relates to a method for the treatment of industrial effluent gases for the removal of sulphur dioxide, according to which the gases are contacted with an absorbing solution, containing alkali metal sulphite and bisulphite, the solution, before the contact stage, being pre-treated with air or other gas inert to the solution, preferably a gas devoid of oxygen, whereby the $SO_2$ partial pressure of the solution is reduced, thus enhancing the $SO_2$ removal from said effluent gases.

6 Claims, 2 Drawing Figures

PROCESS FOR REMOVING SO₂ FROM GASES

This is a continuation of application Ser. No, 701,877 filed July 1, 1976 which is a continuation of application Ser. No. 476,035 filed June 3, 1974, both now abandoned.

This invention concerns the removal of sulphur dioxide ($SO_2$) from gases such as industrial effluent gases that are to be discharged to the atmosphere.

Various processes are known or have been proposed for this purpose. One such process, often called the "sulphite" process, uses a solution of an alkali sulphite/bisulphite to absorb $SO_2$ from gas scrubbed by that solution. The spent solution is then treated in various ways to recover the $SO_2$: typically the spent solution is acidified with sulphuric or phosphoric acid to produce the corresponding alkali sulphate or phosphate as a byproduct.

As hitherto practised or proposed, this process has certain disadvantages: thus it is not usually possible to reduce the $SO_2$ content of the gas to less than about 200/250 ppm, while the treated gas tends to become contaminated with sulphite and/or bisulphite salts that lead to the formation of a mist upon discharge of the treated gas to the atmosphere, and environmental pollution.

An object of the present invention is, therefore, to provide an improvement of such a process so as to enable it to produce a treated gas with much lower $SO_2$ content than is usually possible, and to eliminate or substantially reduce the likelihood of the formation of sulphite and/or bisulphite mists upon discharge of the treated gas.

The invention accordingly provides a process for the removal of sulphur dioxide from gases, such process comprising treating the gas with a solution containing at least an alkali sulphite, preferably with an alkali sulphite/bisulphite solution that has been pretreated with air or with a gas that is inert with respect to the solution in order to reduce the $SO_2$ partial pressure of said solution.

The wording "alkali sulphite/bisulphite solution" as used in the present specification to indicate the absorbing solution is to be construed as referring to a solution which can either contain both sulphite and bisulphite in changing proportions, or only the alkali sulphite.

As compared with prior art practices, the pretreatment of the sulphite/bisulphite solution with air or inert gas, thereby to reduce its $SO_2$ partial pressure, before treating the $SO_2$-containing gas with the solution enables the latter to absorb $SO_2$ very efficiently and to achieve an $SO_2$ content of 50 ppm or less in the treated gas.

In practical embodiments of the invention the pretreatment of the solution is accomplished as a solution regeneration step in a cyclic process in which the solution is repeatedly circulated through an absorption stage and a regeneration stage, $SO_2$ absorbed by the solution in the absorption stage being partially stripped from the solution in the regeneration stage.

We have found that although pretreatment with air or free oxygen-containing gas is effective to lower the $SO_2$ partial pressure of an alkali sulphite/bisulphite solution satisfactorily for the purposes of the process of the invention, optimum reduction of the $SO_2$ partial pressure is accomplished by the use of substantially free oxygen-free gases for the pretreatment. Ideally the gas should have a free oxygen content not more than about 1% by volume: suitable gases are, for instance, nitrogen ($N_2$) carbon dioxide ($CO_2$) and mixtures of $N_2$ and $CO_2$; combustion product gases containing about 1% oxygen by volume have been successfully employed for the pretreatment.

We cannot fully explain the reason for the enhanced lowering of the $SO_2$ partial pressure by pretreatment with a substantially free oxygen-free gas as compared with the treatment of the solution under the same conditions with an oxygen-containing gas such as air: however, it would appear that the use, for pretreatment, of gas substantially devoid of free oxygen avoids or substantially reduces the formation of sulphate ($SO_4^=$) ions, the presence of which in a sulphite/bisulphite solution perhaps is effective to raise the $SO_2$ partial pressure.

The process of the invention is preferably conducted as a multi-stage process, the $SO_2$-containing gas being first treated with an alkali sulphite/bisulphite solution that has a relatively high $SO_2$ partial pressure in comparison with the pretreated solution that the gas encounters in a subsequent stage. The final treatment of the gas is preferably a treatment with water, especially when the alkali sulphite/bisulphite solution is an ammonium sulphite/bisulphite solution.

If there is more than one stage of gas treatment with pretreated sulphite/bisulphite solution, the pretreatment of the solution for each such stage may be the same, or different pretreatments may be employed. For instance, the gas may be treated in successively encountered stages with sulphite/bisulphite solution that has been pretreated with air and with substantially free oxygen-free gas respectively.

Pretreatment of the sulphite/bisulphite solution may also serve to establish a solution pH that is most suitable for effective absorption of $SO_2$ by the solution. This is particularly the case when the solution is an ammonium sulphite/bisulphite solution.

The pretreatment of the solution with air or other gas may be accomplished in a packed or plate column in which the air or other gas flows countercurrently to the solution. The air or gas used for the pretreatment may be at normal temperatures but is preferably at an elevated temperature. However, corrosion problems arise if an attempt is made to pretreat with air or other gas at temperatures significantly in excess of 80° C. and therefore in the preferred practice of the invention the pretreatment is accomplished with air or other gas at a temperature not exceeding 80° C. By observing this limit the need for high cost corrosion-resistant material in the pretreatment equipment is avoided.

Depending upon the nature and concentration of the pretreated sulphite-bisulphite solution, the formation of sulphite/bisulphite mists upon discharge of the treated gas to atmosphere is minimized by holding the solution pH at a value in the range 5.5 to 7.5 when in contact with the gas being treated. In the case of a typical ammonium sulphite/bisulphite solution the pH value should ideally be kept below 6.5. pH control requires suitable regulation of the makeup of alkali and in the case of ammonium sulphite/bisulphite solutions ammonia makeup should be made in the liquid phase to minimize the tendency to mist formation. It is to be noted that the pretreatment of ammonium sulphite/bisulphite solution reduces the ammonia partial pressure as well as the $SO_2$ partial pressure of the solution, and thus reduces the tendency of $SO_2$ in the gas to react with ammonia to form fine particles of ammonium sulphite and bisulphite salts that are readily entrained in the gas and lead to the formation of mists upon discharge of the gas to the atmosphere.

Figure 2:
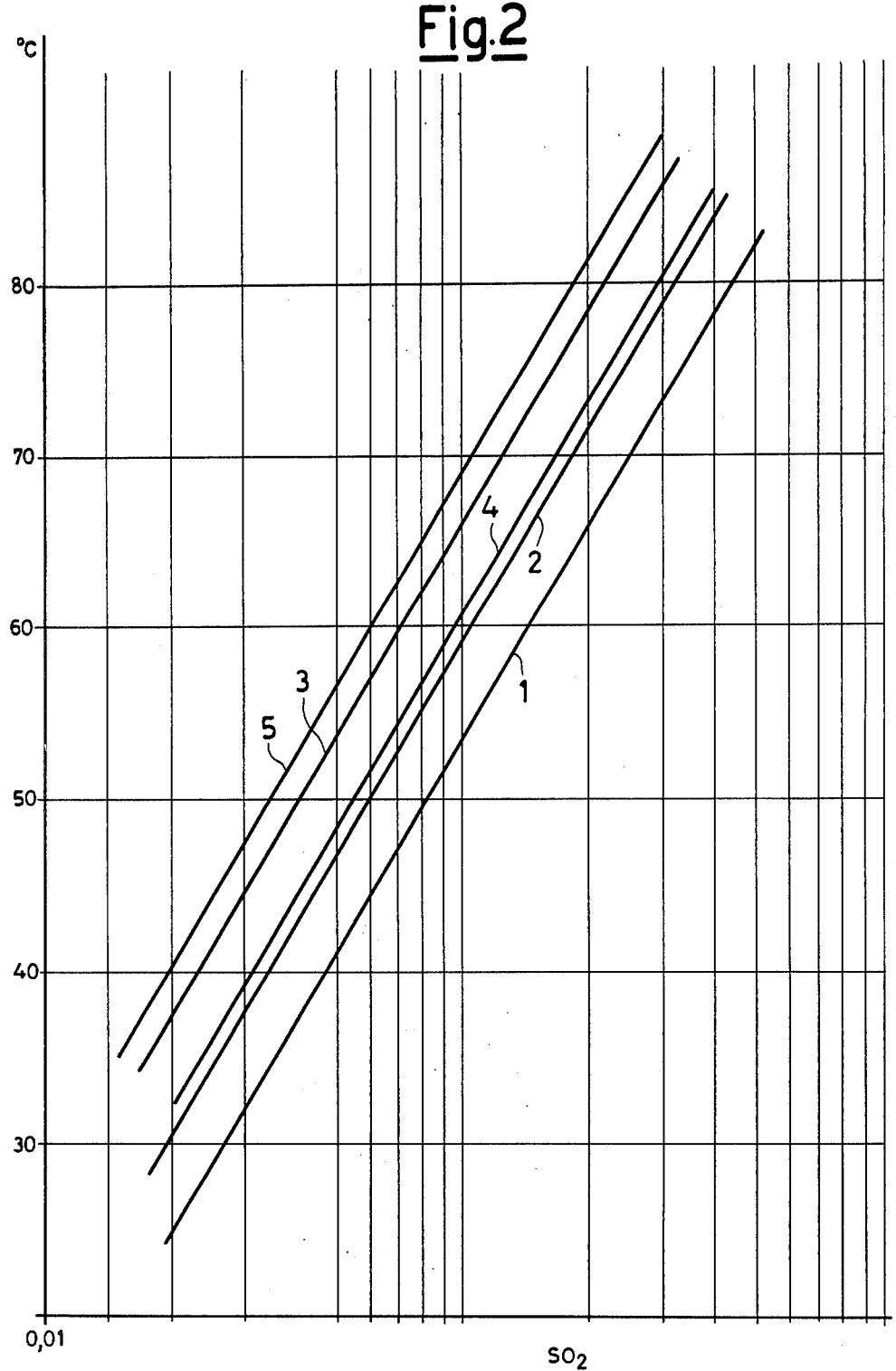

A typical embodiment of the process of the invention will be described by way of example with reference to the accompanying drawings, in which:

FIG. 1 is a block diagram of apparatus for carrying out the process of the invention in accordance with a preferred embodiment thereof; and FIG. 2 is a semi-logarithmic plot of $SO_2$ partial pressure against temperature for an ammonium sulphite/bisulphite solution both without pretreatment and as pretreated under various conditions.

Referring first to FIG. 1, line 1 represents an inlet line for gas to be treated by the process of the invention. In a particular installation of the apparatus to be described, the gas was the off-gas of a sulphuric acid production plant, having an $SO_2$ content of 0.18% by volume and entering the apparatus through line 1 at a flow rate of 90,000 Nm$^3$/hour.

The illustrated apparatus comprises an absorption column 2 having three stacked sections 2a, 2b and 2c, the gas from line 1 entering the lowermost section 2a of the column 2 to flow upwardly through that section and successively through sections 2b and 2c.

In the lowermost section 2a the gas is scrubbed with an ammonium sulphite/bisulphite solution that is sprayed into the upper part of section 2a through nozzles 3 fed by a pump 4 drawing solution continually from the bottom of the column. The pH of the solution sprayed into section 2a is maintained at a value in the range 5.7–6.0 by the regulated sparging of gaseous ammonia ($NH_3$) into a pool of the solution at the bottom of column 2, from line 11. The spray nozzles 3 and the rate of recycling of solution through these nozzles are designed and selected so as to provide a solution contact surface in the range 15,000–20,000 m$^2$ per m$^3$ of absorption volume in section 2a.

The gas that has been subjected to preliminary scrubbing in the absorption column section 2a rises into and through section 2b which, as indicated, is a packed section through which the gas passes upwardly in countercurrent to a descending pretreated ammonium sulphite/bisulphite solution fed to section 2b by a pump 5 through line 6. The pretreated solution fed through line 6 is in fact a portion of a bled-off sidestream of the solution being circulated through the lowermost absorption column section 2a by the pump 4, after the bled-off sidestream portion has been substantially stripped of $SO_2$ (and excess free ammonia) by treatment with air or, preferably, substantially free oxygen-free inert gas in a regeneration column 7.

After absorbing $SO_2$ from the gas in the section 2b, the solution falls into section 2a to join the solution being circulated through that section.

In the absorption column section 2b, the gas is stripped of $SO_2$ down to very low residual levels. Although the gas might then be safely discharged to the atmosphere with little risk of environmental pollution and the formation of mists of sulphite and bisulphite salts, the gas leaving section 2b is, however, given a further treatment in section 2c, again a packed section, in which the gas is washed with water circulated through section 2c by a pump 8; makeup water enters the head of the column from a line 9 and is also utilized for washing the gas in section 2c.

The regeneration column 7 is surmounted by an acidifier 10 comprising a packed column section.

As noted, only part of the bled-off sidestream of the solution being circulated in the lowermost absorption column section 2a by the pump 4 is fed, by line 12, to the head of the regeneration column 7 to be pretreated before entering the absorption column section 2b via line 6. In the regeneration column 7, this sidestream portion descends through packings in countercurrent to a flow of air or, preferably, free oxygen-free inert gas that is pumped into the lower part of the column 7 by means of a compressor 13 and vented from the head of column 7 through line 14 leading to the bottom section 2a of the absorption column 2 so that the stripped $SO_2$ and free ammonia are reabsorbed in the ammonium sulphite/bisulphite solution in column 2.

The remainder of the bled-off sidestream of solution is fed to the acidifier 10 through line 15 to join a stream of acidified solution circulated through the packing in the acidifier 10 by means of a pump 17 and external line 18 including a heat-exchanger 19 for cooling the circulating solution. Acid, in this case sulphuric acid, is added to the circulating solution through line 16 connected to the suction of pump 17.

The $SO_2$ that is liberated by the acidification of the sulphite/bisulphite solution is vented from the acidifier 10 through line 20 that in the case considered extends to the drying tower of the associated sulphuric acid production plant. The energy required to overcome the back pressure of the drying tower is provided by the admission of compressed air to the lower part of the acidifier 10, the compressed air being fed from a compressor 21 through line 22 and a heat exchanger 23 for cooling the air to a suitable temperature. In addition to providing the energy for the purpose indicated, the compressed air in ascending through the packing of the acidifier in countercurrent to the circulating acidified solution effects stripping of the liberated $SO_2$ from the solution.

The volume of acidified solution in the circuit comprising the acidifier 10 is maintained by bleeding off a portion of the circulating solution through a line 24 that conveys the bled-off solution to an ammonium sulphate production plant.

The treated gas leaves the absorption column 2 through a stack 25. In the example considered and using air for pretreatment of the solution introduced into the absorption column section 2b, the treated gas had an average $SO_2$ content of 22 ppm by volume. The hourly consumption of energy and of materials was as follows:

Electricity—130 Kwh
Cooling water—3000 kg
Makeup water—5400 kg
Ammonia—160 kg
Sulphuric acid—680 kg The foregoing description of an embodiment of the process of the invention refers to the use of an ammonium sulphite/bisulphite solution for absorption of $SO_2$ from the gas to be treated. It should be understood that the process of the invention may be performed with other alkali sulphite/bisulphite solutions, for instance sodium or potassium sulphite/bisulphite solutions, using apparatus generally similar to that described although in such cases the final water-washing of the gas, as in the absorption column section 2c, might be omitted without significant effect upon the residual contamination of the treated gas with $SO_2$ and mist-producing salts.

Also the acidification of the bled-off spent sulphite/bisulphite solution may be performed with an acid other than sulphuric acid to liberate the absorbed $SO_2$ and to produce a byproduct salt: for instance, phosphoric acid might be used for acidification of the spent solution introduced into the acidifier 10 in the described apparatus.

As noted in the description, the gas used for pretreatment of the solution introduced into section 2b of the absorption column may be air or another gas that is inert with respect to the solution, and is preferably a gas containing not more than 1% by volume of free oxygen. Improved $SO_2$ removal accomplished by the use of such preferred pretreatment gases and whilst such a gas may be used in the apparatus as described, being introduced into the regeneration column 7 by a compressor 13 in the manner described, the apparatus might in some cases be modified so as to achieve the benefits of the use of such a pretreatment gas with less extensive utilization thereof.

Thus, for instance, absorption of $SO_2$ from the gas to be treated might be conducted in several stages in one or more absorption columns, one or more later stages using an absorbing solution pretreated with substantially free oxygen-free gas, whilst earlier stage(s) use an absorbing solution pretreated with air or a gas containing free oxygen, it being understood that in such case the process may also include an initial stage or stages in which the gas is treated with an unpretreated absorbing solution, and may also include a final water-washing stage as in the embodiment described.

Referring to FIG. 2 of the drawings, partial pressures of $SO_2$ are plotted as a function of temperature for a solution containing ammonium sulphite and bisulphite. The curve 1 relates to the solution without pretreatment, while the curves 2 and 3 respectively relate to the same solution after its pretreatment with air at 40° C. and 60° C. respectively. Curves 4 and 5 relate to the same solution when pretreated with nitrogen at 40° C. and 60° C. respectively.

The curves show that pretreatment of the solution with air results in a reduction of the $SO_2$ partial pressure of the solution at any temperature, the reduction being the greater the higher the temperature of the air used for pretreatment. The curves also show that pretreatment of the solution with nitrogen at any given temperature produced a greater reduction of the $SO_2$ partial pressure than the equivalent pretreatment of the solution with air of the same temperature.

Other tests have shown that similar pretreatment of the same solution by combustion product gases having a free oxygen content of about 1% by volume gives results almost identical to those obtained with the use of nitrogen.

The additional reduction of $SO_2$ partial pressure obtained by the use either of nitrogen or of combustion product gases containing about 1% free oxygen by volume amounted to about 10% of the $SO_2$ partial pressure reduction resulting from similar pretreatment of the same solution with air or a gas containing substantial amounts of free oxygen.

It is apparent from the curves of FIG. 2 that the higher the temperature of the gas used for pretreatment, the lower the resultant partial pressure of $SO_2$ for any given temperature of the solution.

The data for plotting the curves of FIG. 2 was obtained by percolating the ammonium sulphite/bisulphite solution, in countercurrent to the flow of air or the chosen gas, through a column having a diameter of 60 mm packed with glass rings 15 mm×15 mm to a depth of 2800 mm.

What we claim is:

1. A process for removal of sulphur dioxide from an effluent gas comprising treating said gas in at least two successive stages with an absorbing solution selected from the group consisting of an alkali sulphite solution and an alkali sulphite and bisulphite solution, part of said absorbing solution having been pretreated with air or with a gas that is inert with respect to the solution to reduce the $SO_2$ partial pressure of said absorbing solution, wherein said pretreatment of part of the absorbing solution is accomplished as a partial solution regeneration step in a cyclic process in which the pretreated absorbing solution is repeatedly circulated through an absorption stage and a regeneration stage, $SO_2$ absorbed by the solution in the absorption stage being partially stripped from the solution in the regeneration stage and reabsorbed by the solution concurrently with the absorption by the solution of $SO_2$ from the $SO_2$-containing gas, whereby the $SO_2$ content in the effluent gas is reduced to 50 ppm or less.

2. The process of claim 1, wherein the pretreatment of said solution is accomplished at least in part with a gas containing less than 1% free oxygen by volume.

3. The process of claim 2 wherein the $SO_2$-containing gas is treated with a solution pretreated with air or oxygen-containing gas and thereafter said $SO_2$-containing gas is treated with a solution pretreated with the gas containing not more than 1% free oxygen by volume.

4. The process of claim 1 wherein said pretreatment is accomplished with air or gas at a temperature not higher than 80° C.

5. The process of claim 1, wherein the pretreatment is effective to adjust the solution pH to a value in the range 5.5–7.5.

6. The process of claim 1, wherein the treatment of the $SO_2$-containing gas with said pretreated solution is followed by treatment of the gas with water.

* * * * *

UNITED STATES PATENT AND TRADEMARK OFFICE
CERTIFICATE OF CORRECTION

PATENT NO. : 4,164,548
DATED : August 14, 1979
INVENTOR(S) : VITALI ET AL

It is certified that error appears in the above–identified patent and that said Letters Patent are hereby corrected as shown below:

Please change assignee from "Il Gas Interale"S.p.A."

to --IL GAS INTEGRALE S.p.A.--

Signed and Sealed this

Nineteenth Day of February 1980

[SEAL]

Attest:

SIDNEY A. DIAMOND

Attesting Officer     Commissioner of Patents and Trademarks